United States Patent
Kohlberger

(10) Patent No.: US 9,780,415 B2
(45) Date of Patent: Oct. 3, 2017

(54) BATTERY AND MOTOR VEHICLE

(71) Applicants: Robert Bosch GmbH, Stuttgart (DE); Samsung SDI Co., Ltd., Yongin-si, Gyeonggi-do (KR)

(72) Inventor: Markus Kohlberger, Stuttgart (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 170 days.

(21) Appl. No.: 13/972,454

(22) Filed: Aug. 21, 2013

(65) Prior Publication Data

US 2014/0057146 A1    Feb. 27, 2014

(30) Foreign Application Priority Data

Aug. 22, 2012 (DE) .......... 10 2012 214 896

(51) Int. Cl.
*H01M 10/42* (2006.01)
*H01M 2/20* (2006.01)
*H01M 2/34* (2006.01)

(52) U.S. Cl.
CPC ....... *H01M 10/4235* (2013.01); *H01M 2/202* (2013.01); *H01M 2/206* (2013.01); *H01M 2/348* (2013.01); *H01M 2200/103* (2013.01)

(58) Field of Classification Search
CPC .......... H01M 10/4235; H01M 2/206
See application file for complete search history.

(56) References Cited

U.S. PATENT DOCUMENTS

| 4,547,830 | A | * | 10/1985 | Yamauchi | 361/104 |
| 7,312,688 | B2 | * | 12/2007 | Ely et al. | 337/160 |
| 2002/0109574 | A1 | * | 8/2002 | Handcock et al. | 337/292 |
| 2003/0076214 | A1 | | 4/2003 | Ackermann | |
| 2007/0241857 | A1 | | 10/2007 | Ito et al. | |

FOREIGN PATENT DOCUMENTS

| CN | 2845156 Y | 12/2006 | |
| CN | 101859671 A | 10/2010 | |
| CN | 201966274 U | 9/2011 | |
| WO | WO 2009106394 A1 * | 9/2009 | H01M 2/206 |

* cited by examiner

*Primary Examiner* — Patrick Ryan
*Assistant Examiner* — Zhongqing Wei
(74) *Attorney, Agent, or Firm* — Maginot, Moore & Beck LLP

(57) ABSTRACT

A battery includes at least two battery cells and a first electrical connection between a first battery pole of one of the at least two battery cells and a second battery pole of one other battery cell of the at least two battery cells. A second electrical connection branches off from the first electrical connection for the purpose of measuring a battery cell voltage of at least one battery cell of the at least two battery cells.

9 Claims, 2 Drawing Sheets

BATTERY AND MOTOR VEHICLE

This application claims priority under 35 U.S.C. §119 to patent application no. DE 10 2012 214 896.5, filed on Aug. 22, 2012 in Germany, the disclosure of which is incorporated herein by reference in its entirety.

BACKGROUND

The present disclosure relates to a battery module having at least one battery having battery cells, for example lithium ion battery cells, such as are used in traction batteries in electric or hybrid motor vehicles, thus in motor vehicles that are at least in part or intermittently driven in an electric manner. The disclosure therefore also relates to a motor vehicle.

Batteries are being used in an increasingly wide range of applications due to improved storage capacity, the ability to recharge more frequently, increased energy densities and a reduced level of self-discharge. Batteries that have a lower energy storage capacity are used for example for small portable electronic devices such as mobile telephones, laptops, camcorders, power tools, mp3 players and similar devices, while batteries that have a higher capacity are used as an energy source for driving motors in hybrid or electric vehicles etc. or as batteries in stationary applications.

Batteries can be embodied for example by way of the series connection of battery modules, wherein to some extent parallel connections of the battery modules can also be provided and the battery modules can for their part comprise series connected and/or parallel connected battery cells.

Lithium ion technology can be used for a wide range of applications. Lithium ion cells comprise at least one positive and negative electrode (cathode and/or anode) that are capable of reversible intercalation or then de-intercalation of lithium ions (Li+).

The intercalation of lithium ions and/or the de-intercalation of lithium ions require the presence of a so-called lithium ion conducting salt. Lithium hexafluorophosphate (LiPF6) is used as the lithium conducting salt in most lithium ion cell-based batteries that are currently on the market. This applies both in the field of small portable electronic devices and also in the motor vehicle industry.

Other known battery chemical systems are batteries that are based on nickel metal hydride cells, lithium metal polymer cells and lithium polymer cells.

In order to control the individual voltage and temperature of the cells, sensor lines are routed from the cell connections to a voltage monitoring device, possibly to a cell monitoring circuit board.

In accordance with the prior art, the sensor lines are generally embodied as cables or lead frames, wherein the lines have a small cross-section. In the event of a short circuit, the complete line melts as a result of the small cross-section.

SUMMARY

In accordance with the disclosure, a battery is provided having at least two battery cells and having an electrical connection between a battery pole of one of the at least two battery cells and a battery pole of one other of the at least two battery cells. A further electrical connection branches off from the electrical connection for the purpose of measuring a battery cell voltage of at least one of the battery cells.

The battery is characterized by virtue of the fact that the further electrical connection comprises at least two sections, wherein the sections are embodied for different maximum current magnitudes.

This renders it possible to embody one of the sections as a fusible link that melts in the presence of a melting current magnitude that lies between the different maximum current magnitudes. Thus, in comparison to using individual fuses, a safety fuse is provided in the cell monitoring system in a cost-effective and simple manner, which safety fuse separates the connection in the event of a short circuit.

In one embodiment, the different maximum current magnitudes include at least a lower maximum current magnitude that is less than a melting current magnitude and a higher maximum current magnitude that is greater than the melting current magnitude, wherein at least one of the sections is embodied as a fusible section for the lower maximum current magnitude and melts in the presence of the melting current magnitude and at least one other of the sections is embodied for the higher maximum current magnitude and does not melt in the presence of the melting current magnitude.

In an advantageous manner, it is possible to access the fusible section in order to perform a visual inspection.

Thus, the at least one other of the sections can be encased in a synthetic material casing and the fusible section can remain uncovered.

This improves the separating effect.

In one embodiment or in one other embodiment, the fusible section adjoins two of the other of the sections that have the higher maximum current magnitude.

The main directions of extension or main dimension, i.e., longitudinal dimension, of two of the other of the sections can be mutually parallel and two of the other of the sections can be spaced apart from one another at a distance that is greater than zero in a direction that is perpendicular to the parallel main directions of extension.

It can be particularly advantageous for the separating effect if two of the other of the sections are spaced apart from one another at a distance that is at least three millimeters in the direction of the parallel main directions of extension.

If a further fusible section adjoins one of the two of the other of the sections, then one of the two of the other of the sections can extend up to at least two millimeters in the direction of the parallel main directions of extension. Even if the separating effect is interrupted as a result of a voltage flashover after a first fusible section has melted, the melting of the first fusible section causes the other fusible section to melt. Any further voltage flashover is then reliably prevented as a result of the length of the section that lies between the fusible sections.

It is particularly advantageous for the separating effect if the extension amounts to up to five millimeters.

A vehicle having a battery in accordance with the disclosure is also proposed in accordance with the disclosure.

BRIEF DESCRIPTION OF THE DRAWINGS

Exemplary embodiments of the disclosure are further explained with reference to the drawings and the following description. In the drawings.

DETAILED DESCRIPTION

Figure 1:
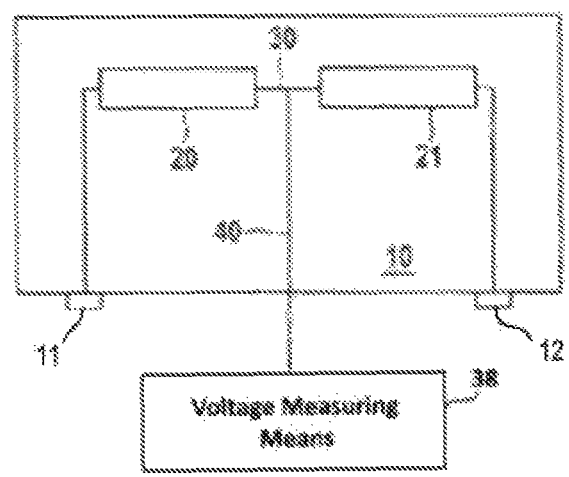
FIG. 1 illustrates an exemplary embodiment of a battery in accordance with the disclosure.

FIG. 1 illustrates a battery 10 having two battery cells 20, 21 that are series connected in an electrical manner by means of an electrical connection 30. It is possible to provide a greater number of battery cells, wherein the battery cells can be mutually connected in series and/or in 10 parallel. A further electrical connection 40 branches off from the electrical connection 30 to a voltage measuring means 38.

The voltage measuring means can be embodied for example as part of a cell monitoring electronics system, part of a battery control device, part of a battery management system or part of the battery and is suitable for ascertaining a voltage between the branch and one of the battery poles 11, 12 and thus for ascertaining a battery cell voltage of at least one of the two battery cells 20, 21.

The electrical connection 40 comprises sections 41, 42 that differ with respect to the maximum current magnitudes for which they are embodied in each case. At least one of the sections 41 is embodied as a fusible section and melts in the presence of a melting current magnitude that is greater than or equal to the maximum current magnitude of the fusible section but less than the maximum current magnitude of one or of several other sections 42.

A current having current magnitudes between the melting current magnitude and the higher maximum current magnitude then causes a melting reaction in the region of the fusible section 41 without causing any corresponding changes in the region of the other section 42.

One option for achieving different maximum current magnitudes for different sections of the connection 40 is to use different cross-sections perpendicular with respect to the main direction of extension (e.g., longitudinal dimension) of the respective section. It has proven to be successful in practice to provide the fusible section with a cross-section that is 10% less than the other sections 42. A fusible section 41 that is one to ten millimeters in length in its main direction of extension demonstrated good separating characteristics during tests.

Another option that can also be used together with a reduced cross-section is to use different materials. In particular, aluminium has proven to be a suitable material for the fusible section(s), since it is cost-effective and melts quickly in the event of an overload.

All the sections or only the fusible sections can be embodied as a lead frame.

In an exemplary embodiment, not illustrated in the figures, the branch of the connection 40 from the connection 30 is produced from aluminium and embodied as a fusible section. The fusible section can be embodied for example at the transition from the connection 40 to a cable lug or to a terminal that is arranged on the connection 30. When using a foil circuit board that is provided with conductor tracks that are embodied from aluminium for the cell monitoring system, the fusible section can be embodied as one of these conductor tracks.

Figure 2:
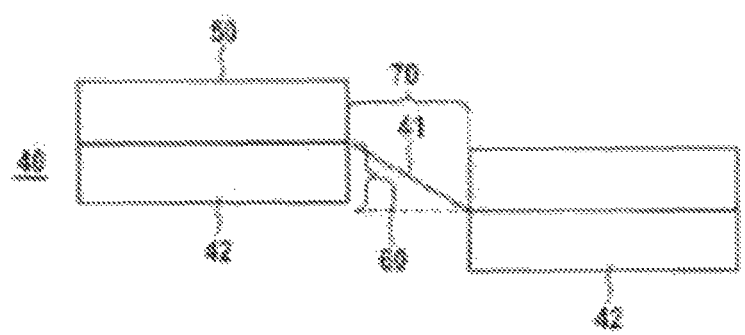
FIG. 2 illustrates a first exemplary embodiment of an electrical connection for the purpose of measuring a battery cell voltage in a battery in accordance with the disclosure.

FIG. 2 illustrates an exemplary electrical connection 40 for ascertaining battery cell voltage together with sections 41, 42.

The connection 40 comprises two sections 42 that are encased by means of a synthetic material casing 50 and are mutually connected by means of a section 41 that remains uncovered. The encased sections 42 adjoin on both ends of the section 41 that remains uncovered. In one embodiment, the section 41 that remains uncovered has a smaller cross-section than the encased sections 42, wherein each of the cross-sections is perpendicular to a main direction of extension of the respective section 41, 42.

The fact that the fusible section 41 is not encased renders it possible for the fusible section 41 to be visually inspected in a simple manner and to improve the separating effect after said fusible section has melted. On the other hand, the fact that the fusible section 41 is encased provides improved protection against the separating effect being interrupted as a result of electrically conductive objects or liquids should accidents occur.

In the exemplary embodiment illustrated in FIG. 2, the main directions of extension of the encased sections 42 are mutually parallel but offset with respect to one another in a direction perpendicular to the parallel main directions of extension. The encased sections 42 are spaced apart from one another at a distance 60 that is greater than zero in the direction that is perpendicular to the parallel main directions of extension. A main direction of extension of the fusible section is therefore not parallel to the parallel main directions of extension. The extension of the fusible section in the main direction of extension of the fusible section is thus greater than a further distance 70 that is greater than zero between the encased sections 42 in the direction of the parallel main directions of extension. A distance 70 of at least three millimeters represents a considerable reduction of voltage flashovers between the sections 42 after the fusible section has melted.

Figure 3:
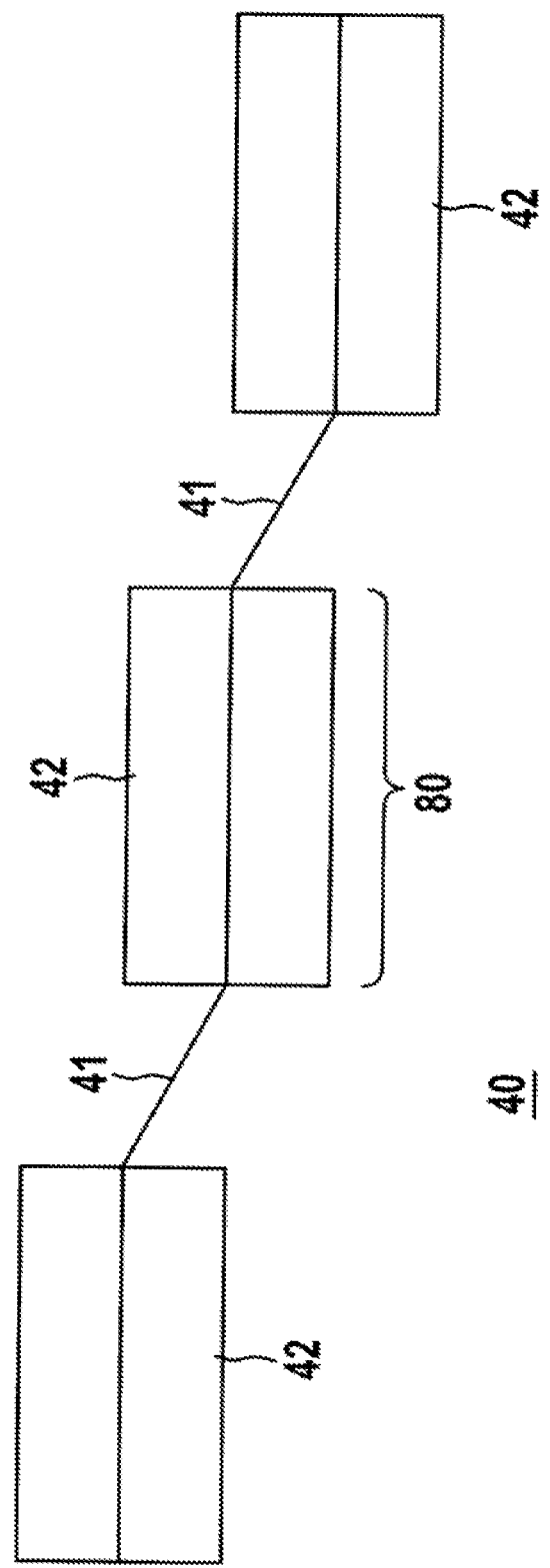
FIG. 3 illustrates a second exemplary embodiment of an electrical connection for the purpose of measuring a battery cell voltage in a battery in accordance with the disclosure.

FIG. 3 illustrates a further exemplary embodiment of an electric connection 40 for the purpose of measuring a battery cell voltage in a battery 10 in accordance with the disclosure. The connection 40 in FIG. 3 comprises by way of example two fusible sections 41, a greater number of fusible sections 41 is also possible. Both ends of each of the fusible sections 41 are adjoined by sections 42 that are connected in an electric manner by means of the respective fusible section 41. The two fusible sections 41 shown in FIG. 3 are consequently adjoined on both ends by a middle section 42 and are connected in an electrical manner by means of the middle section 42. The fusible sections 41 are spaced apart from one another at a distance 80 that is greater than zero in a main extension direction of the middle section 42. In practice, a fusible section spacing 80 of two to five millimeters has proven to be successful.

When a single fusible section 41 is used, an increase in extension of the fusible section in the main direction of extension reduces the number of voltage flashovers between the sections 42 after the fusible section has melted. When a plurality of fusible sections 41 is used, the amount of extension of the fusible section can be small in the main direction of extension, in other words it can be selected in the range from one or a few millimeters. When a plurality of fusible sections 41 is used, the voltage flashover protection is provided by virtue of the fact after a plurality of sections 41 have melted the sections 42, between which the voltage flashover can occur, are additionally spaced apart from one another by the fusible section spacing 80.

In one embodiment, not illustrated, some or all sections 42 also remain uncovered. In a further embodiment, not illustrated, some or all the fusible sections 41 are also encased. Other exemplary embodiments do not have a spacing 70 that is greater than zero between the sections 42.

What is claimed is:

1. A battery comprising:
   a first battery pole and a second battery pole;

a first battery cell and a second battery cell, the first and the second battery cell each having a first cell pole and a second cell pole, the first cell pole of the first battery cell being connected to the first battery pole and the first cell pole of the second battery cell being connected to the second battery pole;

a first electrical connection that extends between and electrically connects the second cell pole of the first battery cell and the second cell pole of the second battery cell; and a second electrical connection that extends between and electrically connects the first electrical connection and a voltage measuring system, the second electrical connection including a first section having a first maximum melting current magnitude and a second section having a second maximum melting current magnitude, the second maximum melting current magnitude being higher than the first maximum melting current magnitude, wherein the first section is a fusible section that melts when exposed to a melting current magnitude, the melting current magnitude being between the first maximum melting current magnitude and the second maximum melting current magnitude, and wherein the second section does not melt when exposed to the melting current magnitude.

2. The battery according to claim 1, wherein the fusible section is visually accessible in order to perform a visual inspection.

3. The battery according to claim 2, wherein:
the second section is encased by a synthetic material casing, and
the fusible section is uncovered.

4. The battery according to claim 1, wherein the second electrical connection further includes a third section, the third section being configured for the second maximum melting current magnitude,
wherein the second section is electrically connected between the fusible section and the first electrical connection, and
wherein the third section is electrically connected between the fusible section and the voltage measuring system.

5. The battery according to claim 4, wherein the second section extends from the first electrical connection to the fusible section in a main direction,
wherein the third section extends from the fusible section toward the voltage measuring system in the main direction such that the third section is arranged parallel to the second section, and
wherein the fusible section extends from the second section to the third section in a direction that is transverse to the main direction such that the third section is laterally offset from the second section by a first distance that is greater than zero in a direction that is perpendicular to the main direction.

6. The battery according to claim 5, wherein the fusible section spaces the third section apart from the second section in the main direction by a second distance that is at least three millimeters.

7. The battery according to claim 5, wherein:
the second electrical connection includes a fourth section that extends between the third section and the voltage measuring system,
a further fusible section extends between and electrically connects the third section and the fourth section, and
the third section has a longitudinal dimension which is oriented in the main direction, the longitudinal dimension of the third section being at least two millimeters.

8. The battery according to claim 7, wherein the longitudinal dimension of the third section is up to five millimeters.

9. A motor vehicle comprising:
a battery including
a first battery pole and a second battery pole;
a first battery cell and a second battery cell, the first and the second battery cell each having a first cell pole and a second cell pole, the first cell pole of the first battery cell being connected to the first battery pole and the first cell pole of the second battery cell being connected to the second battery pole;
a first electrical connection that extends between and electrically connects the second cell pole of the first battery cell and the second cell pole of the second battery cell; and
a second electrical connection that extends between and electrically connects the first electrical connection and a voltage measuring system, the second electrical connection including at least two sections between the first electrical connection and the voltage measuring system,
wherein the at least two sections includes a first section having a first maximum melting current magnitude and a second section having a second maximum melting current magnitude, the second maximum melting current magnitude being higher than the first maximum melting current magnitude,
wherein the first section is a fusible section that melts when exposed to a melting current magnitude, the melting current magnitude being between the first maximum melting current magnitude and the second maximum melting current magnitude, and
wherein the second section does not melt when exposed to the melting current magnitude.

* * * * *